United States Patent
Nagai et al.

(10) Patent No.: US 11,921,091 B2
(45) Date of Patent: Mar. 5, 2024

(54) SAMPLE INJECTION DEVICE AND SAMPLE DISSOLUTION DEVICE

(71) Applicant: SHIMADZU CORPORATION, Kyoto (JP)

(72) Inventors: Yusuke Nagai, Kyoto (JP); Yosuke Iwata, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/636,047

(22) PCT Filed: Feb. 28, 2020

(86) PCT No.: PCT/JP2020/008475
§ 371 (c)(1),
(2) Date: Feb. 17, 2022

(87) PCT Pub. No.: WO2021/033349
PCT Pub. Date: Feb. 25, 2021

(65) Prior Publication Data
US 2022/0334089 A1 Oct. 20, 2022

(30) Foreign Application Priority Data
Aug. 21, 2019 (JP) .................. 2019-151423

(51) Int. Cl.
*G01N 30/16* (2006.01)
*G01N 30/20* (2006.01)

(52) U.S. Cl.
CPC .................. *G01N 30/20* (2013.01)

(58) Field of Classification Search
CPC ............ G01N 30/20; G01N 1/00; G01N 1/28; G01N 30/16; G01N 30/24
(Continued)

(56) References Cited

U.S. PATENT DOCUMENTS 5,305,650 A * 4/1994 Koike .................. G01N 1/28
73/864.21
7,008,599 B1 3/2006 Carlton
(Continued)

FOREIGN PATENT DOCUMENTS

CN 112684080 A * 4/2021 ............ G01N 30/16
JP 10-185893 A 7/1998
(Continued)

OTHER PUBLICATIONS

International Search Report for corresponding Application No. PCT/JP2020/008475, dated May 26, 2020.
(Continued)

*Primary Examiner* — Robert R Raevis
(74) *Attorney, Agent, or Firm* — Renner, Otto, Boisselle & Sklar, LLP

(57) ABSTRACT

A sample injection device is used to inject a sample into a chromatograph and includes a flow vial, a sampling needle and one or more than one sample dissolution devices. A sample is supplied to the flow vial. The sample that has been supplied to the flow vial is collected by the sampling needle and injected into the chromatograph. At least one of ultrasonic waves, an electric field and a magnetic field is used, so that dissolution of a sample to be injected into the chromatograph is promoted by one or more than one sample dissolution devices.

7 Claims, 8 Drawing Sheets

(58) Field of Classification Search
USPC ......... 73/61.55, 61.56, 61.59, 64.56, 863.21,
73/864.21, 864.81; 422/70, 501, 509, 527
See application file for complete search history.

(56) References Cited

U.S. PATENT DOCUMENTS

| | | |
|---|---|---|
| 2008/0264842 A1 | 10/2008 | Hukari |
| 2009/0305264 A1 | 12/2009 | West |
| 2010/0216657 A1 | 8/2010 | Hukari |
| 2012/0006104 A1 | 1/2012 | Cho |
| 2019/0004016 A1 | 1/2019 | Matsumoto |
| 2019/0353625 A1* | 11/2019 | Tomono ................. G01N 30/16 |

FOREIGN PATENT DOCUMENTS

| | | | |
|---|---|---|---|
| JP | 2004506873 A | * | 3/2004 |
| JP | 2008-224372 A | | 9/2008 |
| JP | 2010-505387 A | | 2/2010 |
| JP | 2011-007804 A | | 1/2011 |
| JP | 2011-169886 A | | 9/2011 |
| JP | 2012-018152 A | | 1/2012 |
| WO | 2017/130430 A1 | | 8/2017 |
| WO | 2018/078737 A1 | | 5/2018 |
| WO | 2019/038924 A1 | | 2/2019 |

OTHER PUBLICATIONS

Written Opinion for corresponding Application No. PCT/JP2020/008475, dated May 26, 2020 (English machine translation).

\* cited by examiner

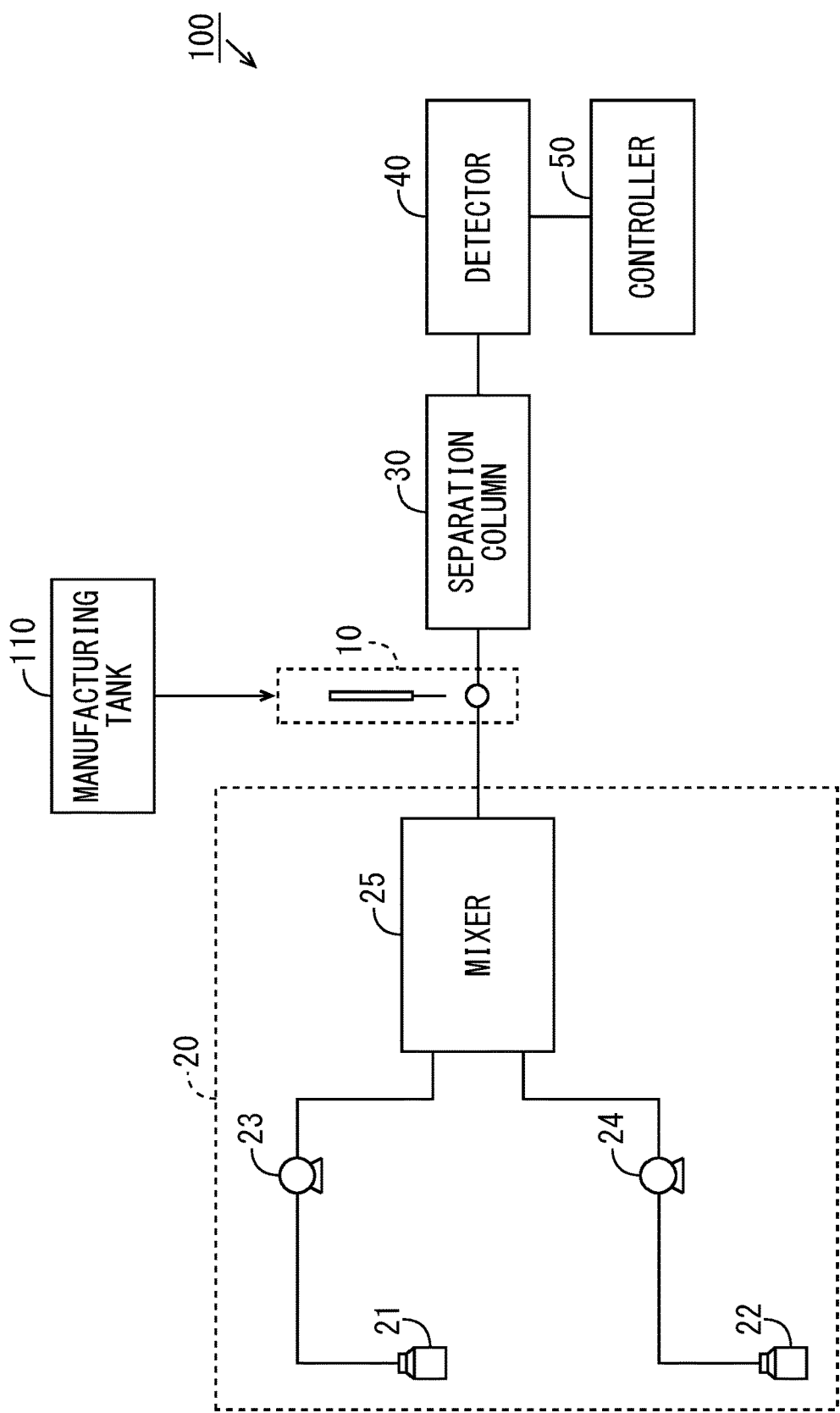
F I G. 1

F I G. 8
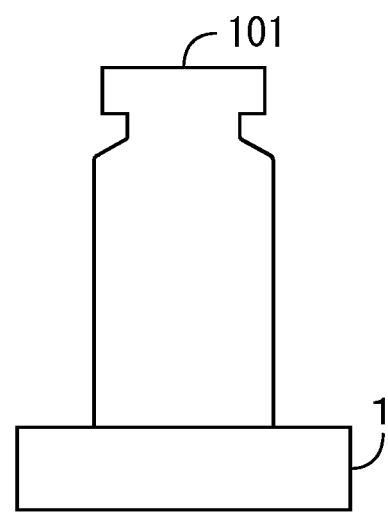

SAMPLE INJECTION DEVICE AND SAMPLE DISSOLUTION DEVICE

TECHNICAL FIELD

The present invention relates to a sample injection device and a sample dissolution device.

BACKGROUND ART

A sample injection device is a device that sucks a sample from a vial and supplies the sample to a column of a liquid chromatograph (LC). The LC is an analysis device that separates a substance included in the sample into different components and is used for research and development, manufacturing or quality control in various fields such as pharmaceuticals, food or chemistry. In particular, a monitoring LC is used to check whether predetermined quality is ensured for manufactured products by continuously analyzing samples in a product manufacturing line in a manufacturing procedure and a quality control procedure.

In the above-mentioned manufacturing procedure and the quality control procedure, the concentration of a sample analyzed by the monitoring LC is relatively high, and the sample often has a slurry shape. Therefore, such a sample may be precipitated or recrystallized in storage or in transit. In this case, the concentration of the sample is non-uniform, so that an analysis cannot be performed with high reproducibility. Further, in a case in which the sample is precipitated or recrystallized in a flow path of the LC, the flow path may be closed and the LC may become damaged.
[Patent Document 1] WO 2019/038924 A1

SUMMARY OF INVENTION

Technical Problem

In the autosampler described in Patent Document 1, a heater is attached to a flow vial containing a sample. Alternatively, a heating jacket is attached to an inlet pipe for supplying a sample into the flow vial. Thus, precipitation of sample components in the flow vial is suppressed. However, in a case in which the concentration of a sample is high, it may not be possible to suppress precipitation of sample components.

An object of the present invention is to provide a sample injection device and a sample dissolution device that can prevent precipitation or recrystallization of a sample even in a case in which the concentration of the sample is high.

Solution to Problem

One aspect according to the present invention relates to a sample injection device that injects a sample into a chromatograph including a flow vial to which a sample is supplied, a sampling needle that collects a sample supplied to the flow vial and injects a collected sample into the chromatograph, and one or more than one sample dissolution devices that promote dissolution of a sample to be injected into the chromatograph using at least one of ultrasonic waves, an electric field and a magnetic field.

Another aspect according to the present invention relates to a sample dissolution device that promotes dissolution of a sample supplied to a vial using at least one of ultrasonic waves, an electric field and a magnetic field.

Advantageous Effects of Invention

The present invention can prevent precipitation or recrystallization of a sample even in a case in which the concentration of the sample is high.

BRIEF DESCRIPTION OF THE DRAWINGS

FIG. 1 is a diagram showing the configuration of a chromatograph including a sample injection device according to a first embodiment of the present invention.

FIG. 8 is a schematic diagram showing the configuration of a sample dissolution device according to another embodiment.

DESCRIPTION OF EMBODIMENTS

Figure 2:
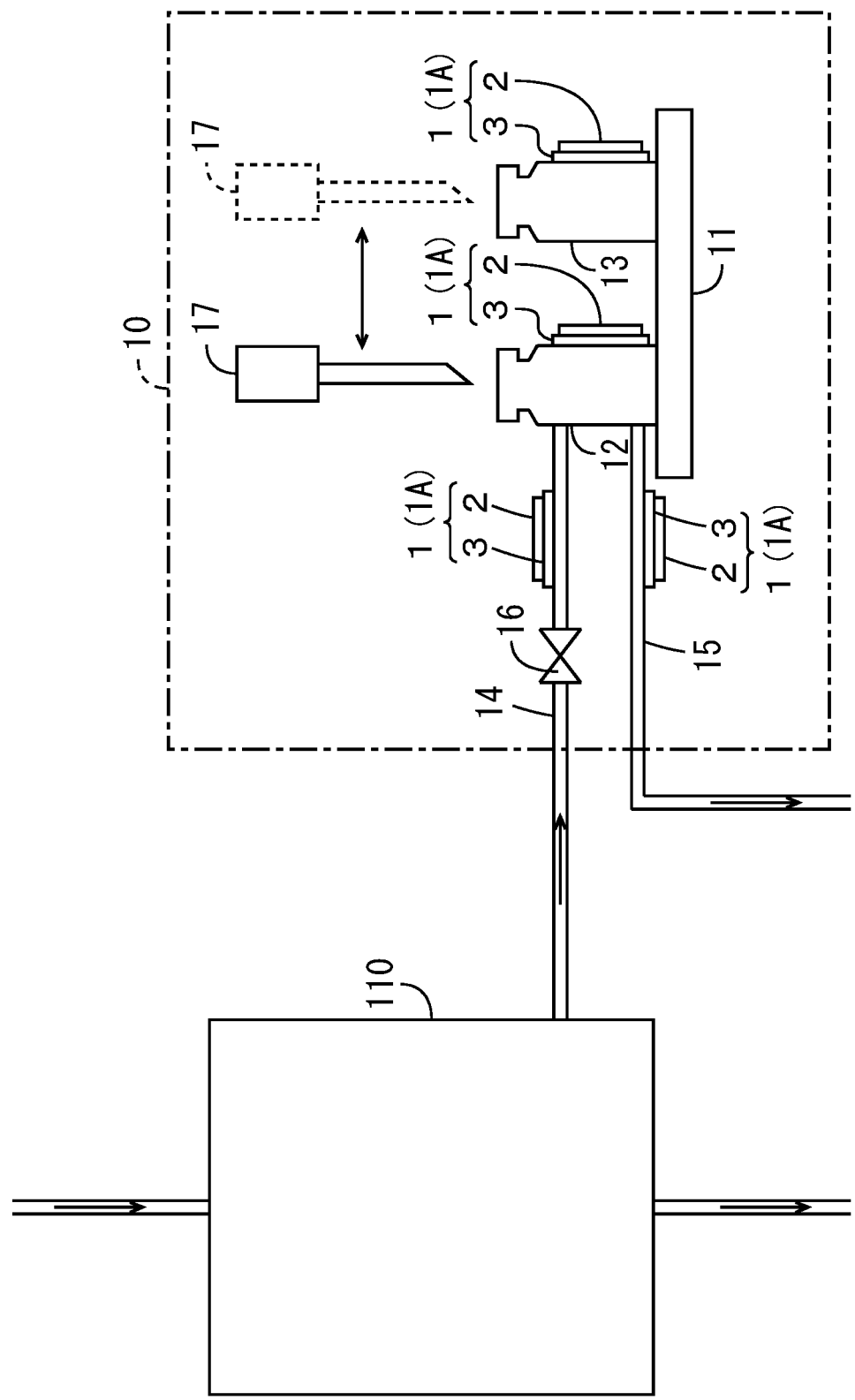
FIG. 2 is a schematic diagram showing the configuration of the sample injection device of FIG. 1.

[1] First Embodiment (1) Configuration of Chromatograph

A sample injection device and a sample dissolution device according to embodiments of the present invention will be described below in detail with reference to the drawings. FIG. 1 is a diagram showing the configuration of a chromatograph including the sample injection device according to a first embodiment of the present invention. In the present embodiment, the chromatograph 100 is a monitoring liquid chromatograph that continuously analyzes a sample in a manufacturing line for products in pharmaceutical, food, chemical industries, etc. A manufacturing tank 110 storing a solution including a sample to be analyzed is provided in the manufacturing line. A sample stored in the manufacturing tank 110 has a relatively high concentration.

As shown in FIG. 1, the chromatograph 100 includes a sample injection device 10, an eluent supplier 20, a separation column 30, a detector 40 and a controller 50. The sample injection device 10 collects part of a solution including a sample (hereinafter simply referred to as a sample) stored in the manufacturing tank 110 and injects the collected sample into the separation column 30 together with an eluent supplied by the eluent supplier 20. Details of the sample injection device 10 will be described below.

The eluent supplier 20 includes two bottles 21, 22, two liquid senders 23, 24 and a mixer 25. An aqueous solution and an organic solvent are respectively stored in the bottles 21, 22 as eluents. The liquid senders 23, 24 are liquid sending pumps, for example. The liquid sender 23 pumps the eluent stored in the bottle 21. The liquid sender 24 pumps the eluent stored in the bottle 22. The mixer 25 is a gradient mixer, for example. The mixer 25 mixes the eluent pumped by the liquid sender 23 and the eluent pumped by the liquid sender 24 at any ratio and supplies the mixed eluent while changing a mixture ratio.

The separation column 30 is housed in a column oven (not shown), and its temperature is adjusted to a predetermined constant temperature. The separation column 30 separates a sample injected by the sample injection device 10 into components according to differences in chemical property or composition. The detector 40 detects components into which the sample is separated by the separation column 30.

The controller 50 includes a CPU (Central Processing Unit) and a memory, or a microcomputer or the like and controls the operation of each of the sample injection device 10, the eluent supplier 20, the separation column 30 (column oven) and the detector 40. Further, the controller 50 generates a chromatogram representing the relationship between a retention time of each component and a detection intensity by processing a result of detection by the detector 40.

(2) Configuration of Sample Injection Device

FIG. 2 is a schematic diagram showing the configuration of the sample injection device 10 of FIG. 1. As shown in FIG. 2, the sample injection device 10 includes a supporter 11, a flow vial 12, a dilution vial 13, a supply flow path 14, a discharge flow path 15, a valve 16 and a sampling needle 17 (hereinafter referred to as a needle 17). The supporter 11 supports the flow vial 12 and the dilution vial 13.

The supply flow path 14 connects the flow vial 12 and the manufacturing tank 110 to each other. The discharge flow path 15 connects the flow vial 12 and a liquid drain (not shown) to each other. The valve 16 is provided in the supply flow path 14. When the valve 16 is opened, part of a sample stored in the manufacturing tank 110 is supplied to the flow vial 12 through the supply flow path 14. Thereafter, the supplied sample may be stored temporarily in the flow vial 12 by closing of the valve 16. The sample supplied to the flow vial 12 is discarded to the liquid drain through the discharge flow path 15.

The needle 17 sucks the sample in the flow vial 12 and discharges the sample to the dilution vial 13. The sample is diluted by being mixed with a dilute liquid in the dilution vial 13. The needle 17 sucks the diluted sample in the dilution vial 13 and injects the sample into the separation column 30 of FIG. 1. In a case in which the sample does not need to be diluted, the sample injection device 10 does not have to include the dilution vial 13. In this case, the needle 17 sucks the sample in the flow vial 12 and injects the sample into the separation column 30.

Further, the sample injection device 10 further includes one or more than one (four in the present example) sample dissolution devices 1. The four sample dissolution devices 1 are respectively attached to the flow vial 12, the dilution vial 13, the supply flow path 14 and the discharge flow path 15. Specifically, each sample dissolution device 1 includes an ultrasonic element 2 and an ultrasonic transmission member 3. Each ultrasonic element 2 is attached to an attachment subject (the flow vial 12, the dilution vial 13, the supply flow path 14 or the discharge flow path 15) via a corresponding ultrasonic transmission member 3.

An ultrasonic element 2 generates ultrasonic waves by being driven at a frequency of not less than 100 Hz and not more than 1 MHz, for example. An ultrasonic element 2 may be driven successively or intermittently. An ultrasonic transmission member 3 is formed of a silicone rubber, for example. An ultrasonic transmission member 3 may be formed of another elastic material or may be formed of gel, grease, etc.

Ultrasonic waves generated by an ultrasonic element 2 are transmitted to the above-mentioned attachment subject through an ultrasonic transmission member 3. In this case, cavitation occurs in a solution in the attachment subject, so that dissolution of a sample is promoted. Thus, even in a case in which the concentration of the sample is high, precipitation or recrystallization of the sample can be prevented.

While the sample dissolution devices 1 are attached to all of the four attachment subjects in the present example, the embodiment is not limited to this. The sample dissolution device 1 may be attached to only one attachment subject, the sample dissolution devices 1 are preferably attached to two or more than two attachment subjects and the sample dissolution devices 1 are more preferably attached to three or more than three attachment subjects.

In particular, in a case in which the sample dissolution device 1 is attached to the flow vial 12 or the supply flow path 14, precipitation or recrystallization of a sample in the flow vial 12 can be prevented efficiently. In a case in which the sample dissolution device 1 is attached to the dilution vial 13, precipitation or recrystallization of a sample in the dilution vial 13 can be prevented more efficiently. In a case in which the sample dissolution device 1 is attached to the discharge flow path 15, clogging of the discharge flow path 15 caused by precipitation or recrystallization of a sample can be prevented, and liquid can be drained efficiently.

While the sample dissolution device 1 is attached to the side surface of each of the flow vial 12 and the dilution vial 13 in the example of FIG. 2, the embodiment is not limited to this. The sample dissolution device 1 may be attached to not the side surface but the bottom surface of the flow vial 12, or the sample dissolution devices 1 may be attached to both of the bottom surface and the side surface of the flow vial 12. Similarly, the sample dissolution device 1 may be attached to not the side surface but the bottom surface of the dilution vial 13, or the sample dissolution devices 1 may be attached to both of the bottom surface and the side surface of the dilution vial 13.

(3) Modified Example of Sample Dissolution Device

Figure 3:
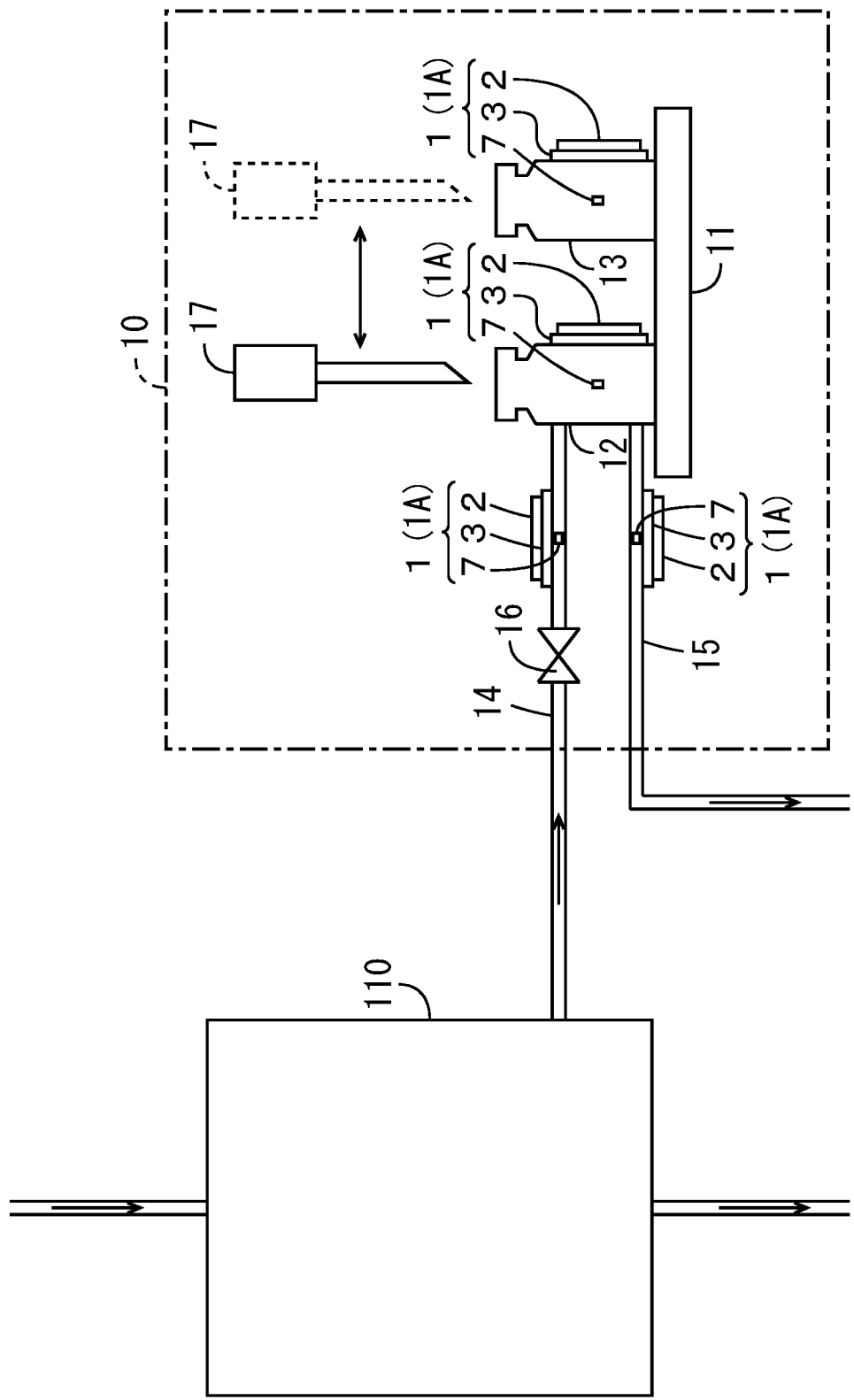
FIG. 3 is a diagram showing the configuration of a sample injection device including sample dissolution devices according to a first modified example.

FIG. 3 is a diagram showing the configuration of a sample injection device 10 including sample dissolution devices 1 according to a first modified example. As shown in FIG. 3, the sample dissolution device 1 according to the first modified example further includes a heater 7. The heater 7 is attached to an attachment subject and heats a solution in the attachment subject to a temperature of not less than 40° C. and not more than 60° C., for example. In this case, dissolution of a sample into the solution is further promoted. Thus, precipitation or recrystallization of the sample can be prevented more efficiently.

The sample dissolution device 1 of FIG. 2 or 3 includes a supersonic element 2 and a supersonic transmission member 3 and promotes dissolution of a sample into a solution using ultrasonic waves. The sample dissolution device 1 of FIG. 2 or 3 is referred to as an ultrasonic-type sample dissolution device 1A. In a case in which ultrasonic waves can be transmitted to an attachment subject sufficiently, the ultrasonic-type sample dissolution device 1A does not have to include an ultrasonic transmission member 3, and an ultrasonic element 2 may be directly attached to the attachment subject.

Figure 4:
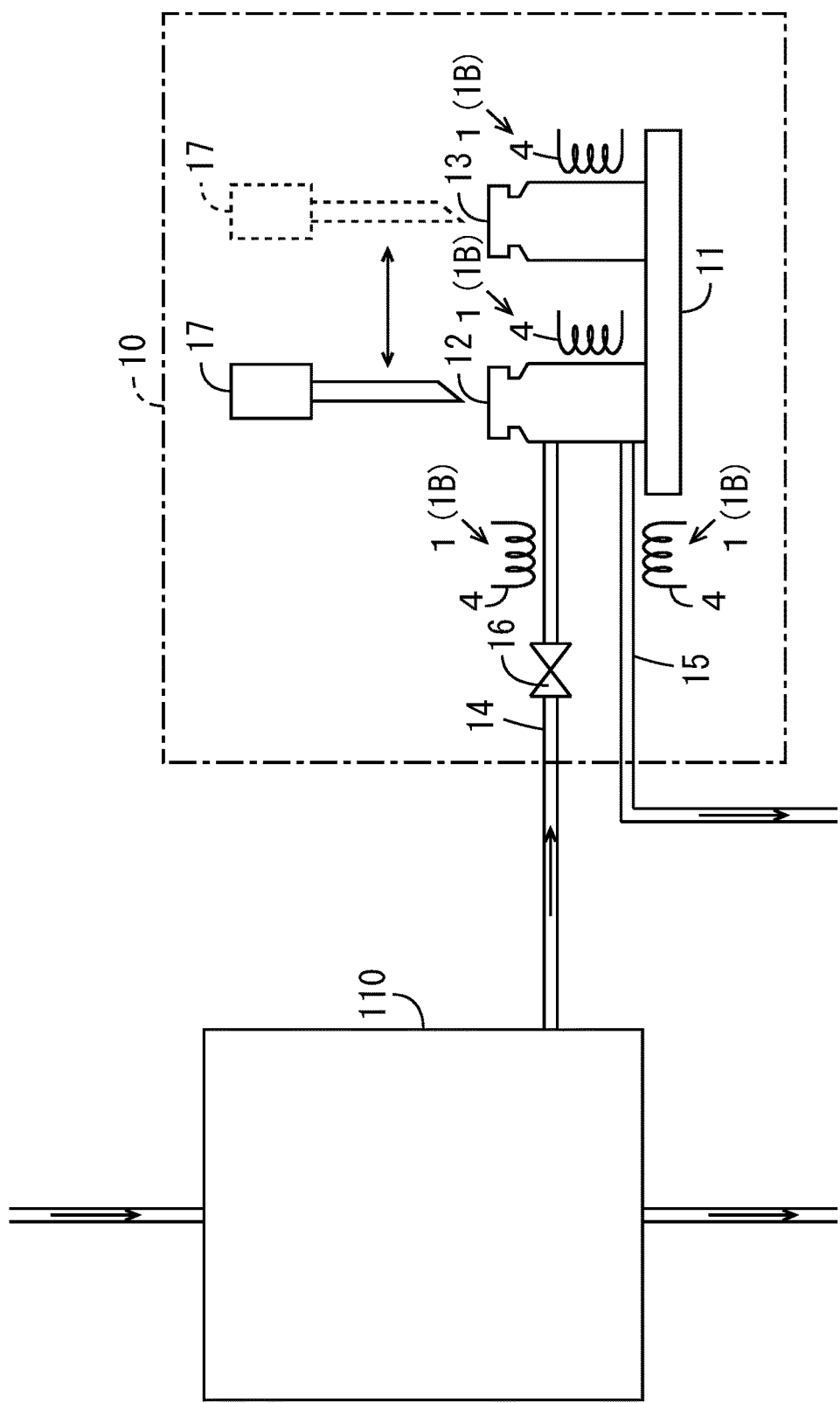
FIG. 4 is a diagram showing the configuration of a sample injection device including sample dissolution devices according to a second modified example.

The sample dissolution device 1 is not limited to the ultrasonic-type sample dissolution device 1A. FIG. 4 is a diagram showing the configuration of a sample injection device 10 including sample dissolution devices 1 according to a second modified example. As shown in FIG. 4, the sample dissolution device 1 according to the second modified example includes a coil 4 instead of an ultrasonic element 2 and an ultrasonic transmission member 3. The coil 4 is attached to an attachment subject (the flow vial 12, the dilution vial 13, the supply flow path 14 or the discharge flow path 15). The coil 4 may be wound around an attachment subject.

The coil 4 is driven by a current flow and generates a magnetic field. A sample in the above-mentioned attachment subject is irradiated with a magnetic field generated by the coil 4, whereby dissolution of the sample into a solution is promoted. Thus, even in a case in which the concentration of a sample is high, precipitation or recrystallization of the sample can be prevented. The sample dissolution device 1 of FIG. 4 is referred to as a magnetic field-type sample dissolution device 1B.

Figure 5:
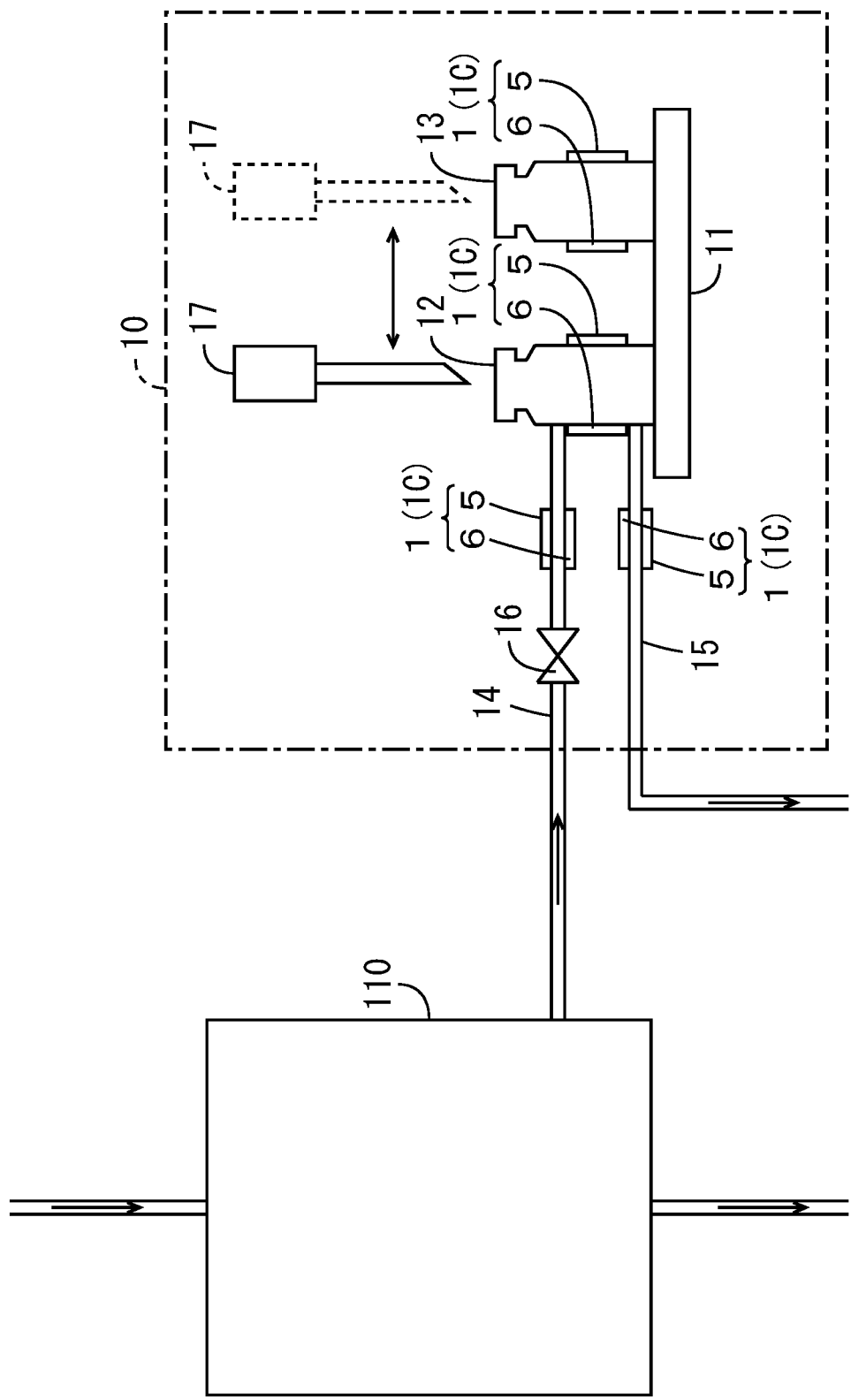
FIG. 5 is a diagram showing the configuration of a sample injection device including sample dissolution devices according to a third modified example.

FIG. 5 is a diagram showing the configuration of a sample injection device 10 including sample dissolution devices 1 according to a third embodiment. As shown in FIG. 5, the sample dissolution device 1 according to the third modified example includes a pair of electrodes 5, 6 instead of an ultrasonic element 2 and an ultrasonic transmission member 3. A pair of electrodes 5, 6 is attached to an attachment subject.

Electrodes 5, 6 are driven by application of a voltage and generates an electric field. Electrophoresis is induced in sample components in the above-mentioned attachment subject by a generated electric field, so that dissolution of a sample into a solution is promoted. Thus, even in a case in which the concentration of a sample is high, precipitation or recrystallization of the sample can be prevented. The sample dissolution device 1 of FIG. 5 is referred to as an electric field-type sample dissolution device 1C.

Similarly to the ultrasonic-type sample dissolution device 1A of FIG. 3, the magnetic field-type sample dissolution device 1B or the electric field-type sample dissolution device 1C may further include the heater 7 attachable to an attachment subject. In this case, similarly to the first modified example, dissolution of a sample into a solution in an attachment subject is further promoted. Thus, precipitation or recrystallization of the sample can be prevented more efficiently.

(4) Timing for Driving Sample Dissolution Device

Timing for driving the sample dissolution device 1 is controlled by the controller 50 of FIG. 1 such that dissolution of a sample into a solution is promoted in a period including a point in time (a point t2 in time, described below) at which collection of a sample from the flow vial 12 by the needle 17 ends. Thus, precipitation or recrystallization of the sample to be collected by the needle 17 can be prevented more efficiently.

Figure 6:
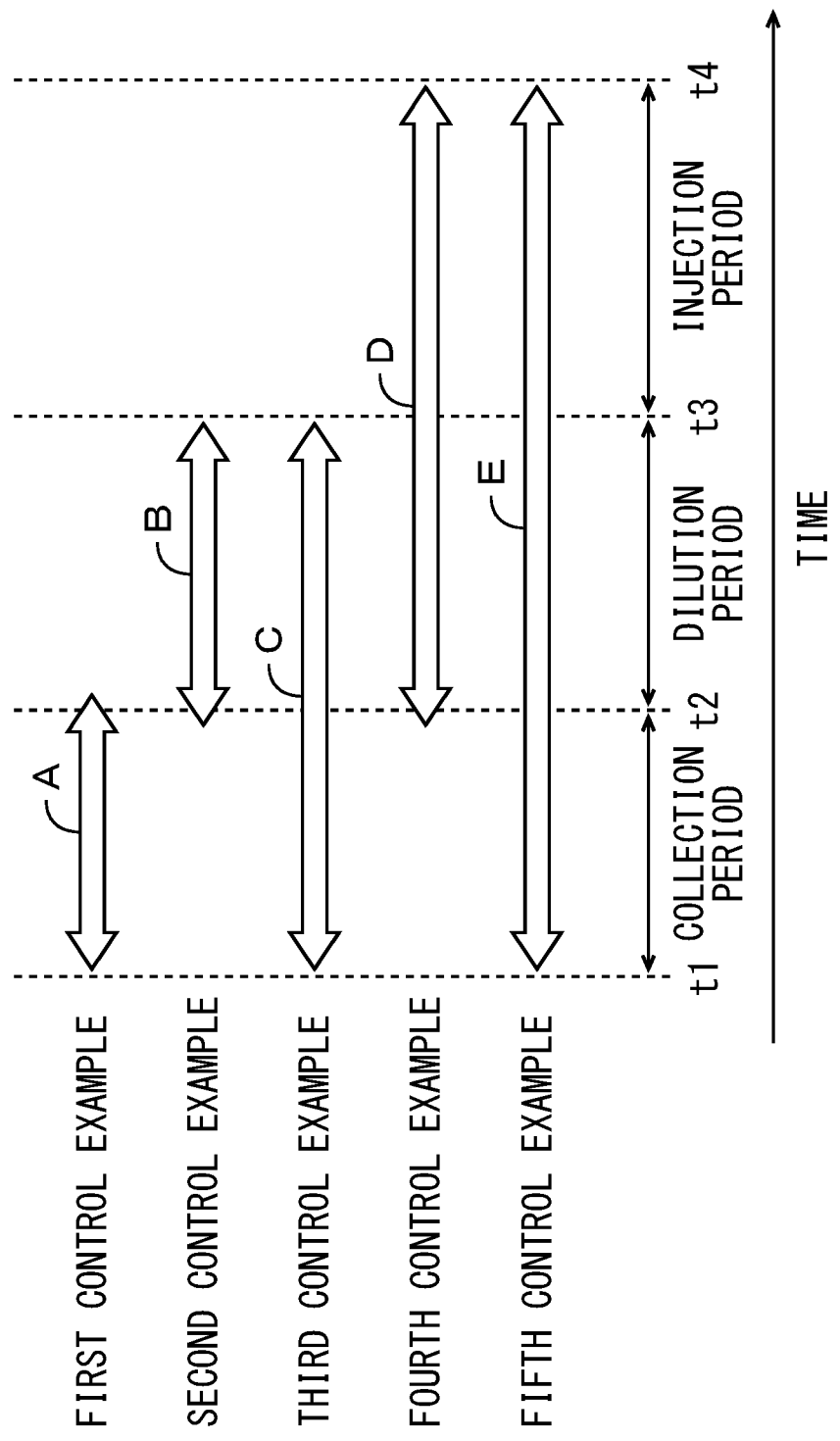
FIG. 6 is a diagram showing an example of timing for driving a sample dissolution device.

FIG. 6 is a diagram showing an example of the timing for driving the sample dissolution device 1. In the example of FIG. 6, a collection period in which a sample in the flow vial 12 is collected by the needle 17, a dilution period in which a sample is diluted in the dilution vial 13 and an injection period in which a sample is injected into the separation column 30 are provided in this chronological order.

Specifically, the needle 17 is guided to the flow vial 12 at a point t1 in time, and collection of a sample from the flow vial 12 by the needle 17 ends at the point t2 in time. The period between the points t1, t2 in time is the collection period. The needle 17 is guided from the flow vial 12 to the dilution vial 13 at the point t2 in time, and suction of a diluted sample from the dilution vial 13 by the needle 17 ends at a point t3 in time. The period between the points t2, t3 in time is the dilution period. The needle 17 is guided to the separation column 30 of FIG. 1 from the dilution vial 13 at the point t3 in time, and injection of a sample into the separation column 30 by the needle 17 ends at a point t4 in time. The period between the points t3, t4 in time is the injection period.

In a first control example indicated by the arrow A in FIG. 6, driving of the sample dissolution device 1 starts at the start point t1 in time of the collection period. Further, driving of the sample dissolution device 1 ends later than the end point t2 in time of the collection period (the start point t2 in time of the dilution period) and earlier than the start point 3 in time of the dilution period (the start point t3 in time of the injection period). In a second control example indicated by the arrow B in FIG. 6, driving of the sample dissolution device 1 starts later than the start point t1 in time of the collection period and earlier than the end point t2 in time of the collection period. Further, driving of the sample dissolution device 1 ends at the end point t3 in time of the dilution period.

In a third control example indicated by the arrow C in FIG. 6, driving of the sample dissolution device 1 starts at the start point t1 in time of the collection period. Further, driving of the sample dissolution device 1 ends at the end point t3 in time of the dilution period. In a fourth control example indicated by the arrow D in FIG. 6, driving of the sample dissolution device 1 starts later than the start point t1 in time of the collection period and earlier than the end point t2 in time of the collection period. Further, driving of the sample dissolution device 1 ends at the end point t4 in time of the injection period. In a fifth control example indicated by the arrow E in FIG. 6, driving of the sample dissolution device 1 starts at the start point t1 in time of the collection period. Further, driving of the sample dissolution device 1 ends at the end point t4 in time of the injection period.

In the first, third or fifth control example, driving of the sample dissolution device 1 may be started later than the start point t1 in time of the collection period and earlier than the end point t2 in time of the collection period. In the second or fourth control example, driving of the sample dissolution device 1 may end later than the start point t2 in time of the dilution period and earlier than the end point t3 in time of the dilution period. In the fourth or fifth control example, driving of the sample dissolution device 1 may end later than the start point t3 in time of the injection period and earlier than the end point t4 in time of the injection period.

Further, in a case in which the sample dissolution device 1 is not attached to the flow vial 12, the supply flow path 14 or the discharge flow path 15, and the sample dissolution device 1 is attached to only the dilution vial 13, the sample dissolution device 1 may be driven at another point in time. For example, the sample dissolution device 1 may be driven in a period including a point in time at which suction of a sample from the dilution vial 13 by the needle 17 ends (the above-mentioned point t3 in time.)

(5) Effects

In the sample injection device 10 according to the present embodiment, a sample is supplied to the flow vial 12 through the supply flow path 14. The sample in the flow vial 12 is discharged through the discharge flow path 15. The sample supplied to the flow vial 12 is collected by the needle 17 and injected into the dilution vial 13. In this case, the sample is diluted in the dilution vial 13. The sample diluted in the dilution vial 13 is injected into the chromatograph 100 by the needle 17.

Here, the sample dissolution device 1 is attached to at least one of the flow vial 12, the dilution vial 13, the supply flow path 14 and the discharge flow path 15. Further, at least one of ultrasonic waves, an electric field and a magnetic field is used, so that dissolution of a sample to be injected into the chromatograph 100 is promoted by the sample dissolution device 1. This facilitates re-dissolution of the sample even in a case in which precipitation or recrystallization of the sample occurs. As a result, even in a case in which the concentration of a sample is high, precipitation or recrystallization of the sample can be prevented.

[2] Second Embodiment

Figure 7:
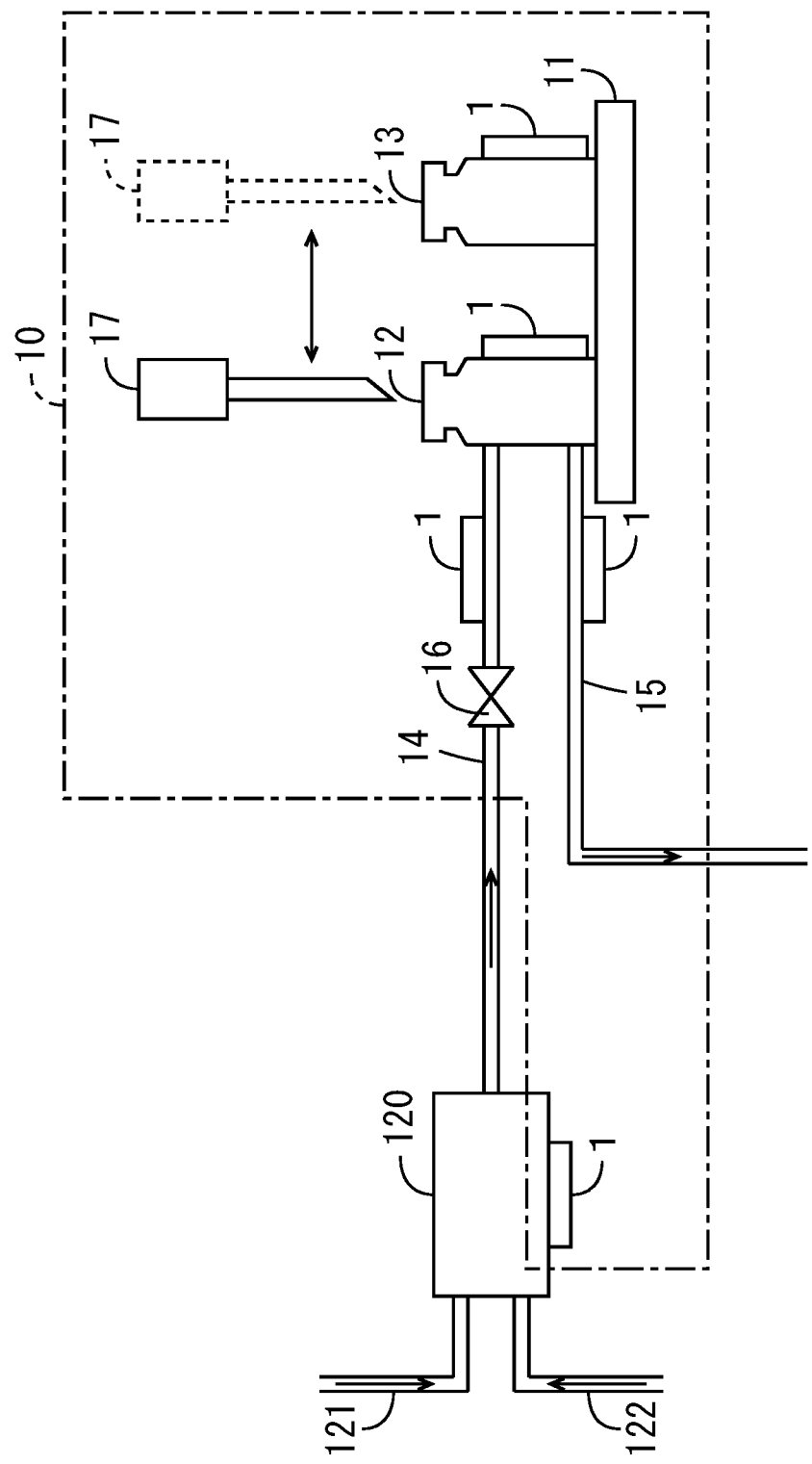
FIG. 7 is a schematic diagram showing the configuration of a sample injection device according to a second embodiment of the present invention.

In regard to a sample injection device 10 according to a second embodiment, differences from the sample injection device 10 according to the first embodiment will be described below. FIG. 7 is a schematic diagram showing the configuration of a sample injection device 10 according to the second embodiment of the present invention. As shown in FIG. 7, in the present embodiment, a reactor 120 is provided in a manufacturing line.

Supply flow paths 121, 122 to which first and second samples are respectively supplied are connected to the reactor 120. Further, a supply flow path 14 connects a flow vial 12 and the reactor 120 to each other. The first and second samples respectively supplied through the supply flow paths 121, 122 react in the reactor 120, whereby a mixed sample having a high concentration is generated and stored in the reactor 120. The reactor 120 is an example of a storage. The generated mixed sample is supplied to the flow vial 12 through the supply flow path 14.

In the present embodiment, the reactor 120 is further included as an attachment subject to which a sample dissolution device 1 is attached. Thus, even in a case in which a mixed sample having a high concentration is generated in the reactor 120, precipitation or recrystallization of the mixed sample can be prevented. The sample dissolution device 1 attached to each of attachment subjects may be any of the ultrasonic-type sample dissolution device 1A, the electric field-type sample dissolution device 1B and the magnetic field-type sample dissolution device 1C. Further, the sample dissolution device 1 may further include the heater 7 of FIG. 3.

While the sample dissolution devices 1 are attached to all of the five attachment subjects (the flow vial 12, the dilution vial 13, the supply flow path 14, the discharge flow path 15 and the reactor 120), the embodiment is not limited to this. The sample dissolution device 1 may be attached to only one attachment subject (only the reactor 120, for example). The sample dissolution devices 1 are preferably attached to two or more than two attachment subjects, the sample dissolution devices 1 are more preferably attached to three or more than three attachment subjects and the sample dissolution devices 1 are even more preferably attached to four or more than four attachment subjects.

[3] Other Embodiments (1) While the sample dissolution device 1 is provided in the sample injection device 10 in the above-mentioned embodiment, the embodiment is not limited to this. The sample dissolution device 1 does not have to be provided in the sample injection device 10, and the sample dissolution device 1 may be used alone. FIG. 8 is a schematic diagram showing the configuration of a sample dissolution device 1 according to another embodiment. As shown in FIG. 8, the sample dissolution device 1 is used as a platform on which a vial 101 is to be placed. Alternatively, the sample dissolution device 1 may be attached to the side surface of the vial 101.

A user injects a sample to be analyzed into the vial 101 using a tool such as a pipette. In this case, dissolution of the sample is promoted in the vial 101 by driving of the sample dissolution device 1. Thus, even in a case in which the concentration of a sample is high, precipitation or recrystallization of the sample can be prevented. The sample dissolution device 1 of FIG. 8 may be any of the ultrasonic-type sample dissolution device 1A, the magnetic field-type sample dissolution device 1B and the electric field-type sample dissolution device 1C. Further, the sample dissolution device 1 may further include the heater 7 of FIG. 3.

(2) While the same type of the sample dissolution device 1 is attached to a plurality of attachment subjects in the above-mentioned embodiment, the embodiment is not limited to this. Different types of sample dissolution devices 1 may be attached to a plurality of attachment subjects. For example, the ultrasonic-type sample dissolution device 1A may be attached to the dilution vial 13, the magnetic field-type sample dissolution device 1B may be attached to the supply flow path 14, and the electric field-type sample dissolution device 1C may be attached to the discharge flow path 15. Further, part or all of the ultrasonic-type sample dissolution device 1A, the magnetic field-type sample dissolution device 1B and the electric field-type sample dissolution device 1C may be combined to be attached to the same attachment subject.

(3) While dissolution of a sample is promoted efficiently by attachment of the sample dissolution device 1 to at least one of the flow vial 12, the dilution vial 13, the supply flow path 14, the discharge flow path 15 and the reactor 120 in the above-mentioned embodiment, the embodiment is not limited to this. The sample dissolution device 1 may be attached to a member other than the above-mentioned attachment subjects.

[4] Aspects

It is understood by those skilled in the art that the plurality of above-mentioned illustrative embodiments are specific examples of the below-mentioned aspects.

(Item 1) A sample injection device according to one aspect that injects a sample into a chromatograph may include a flow vial to which a sample is supplied, a sampling needle that collects a sample supplied to the flow vial and injects a collected sample into the chromatograph, and one or more than one sample dissolution devices that promote dissolution of a sample to be injected into the chromatograph using at least one of ultrasonic waves, an electric field and a magnetic field.

In this sample injection device, a sample supplied to the flow vial is collected by the sampling needle, and the collected sample is injected into the chromatograph. Here, at least one of ultrasonic waves, an electric field and a magnetic field is used, so that dissolution of a sample to be injected into the chromatograph is promoted by one or more than one sample dissolution devices. This facilitates re-dissolution of the sample even in a case in which precipitation or recrystallization of the sample occurs. As a result, even in a case in which the concentration of a sample is high, precipitation or recrystallization of the sample can be prevented.

(Item 2) The sample injection device according to item 1 may further include a supply flow path that supplies a sample to the flow vial, and a discharge flow path that discharges a sample supplied to the flow vial, wherein the one or more than one sample dissolution devices may be attached to at least one of the flow vial, the supply flow path and the discharge flow path.

In this case, in at least one of the flow vial, the supply flow path and the discharge flow path, dissolution of a sample is promoted more efficiently. This can prevent precipitation or recrystallization of the sample more efficiently.

(Item 3) The sample injection device according to item 2, wherein the one or more than one sample dissolution devices may be attached to at least two of the flow vial, the supply flow path and the discharge flow path.

In this case, in at least two of the flow vial, the supply flow path and the discharge flow path, dissolution of a sample is promoted more efficiently. This can prevent precipitation or recrystallization of the sample more efficiently.

(Item 4) The sample injection device according to item 2 or 3, wherein the one or more than one sample dissolution devices may promote dissolution of a sample by generating at least one of ultrasonic waves, an electric field and a magnetic field in a period including a point in time at which collection of a sample from the flow vial by the sampling needle ends.

In this case, precipitation or recrystallization of a sample collected by the sampling needle can be prevented more efficiently.

(Item 5) The sample injection device according to any one of items 1 to 4 may further include a dilution vial that dilutes a sample, wherein the sampling needle may inject a sample collected from the flow vial into the dilution vial and then may operate to inject a sample diluted by the dilution vial into the chromatograph, and the one or more than one dissolution devices may be attached to the dilution vial.

In this case, a sample can be diluted by the dilution vial. Further, precipitation or recrystallization of the sample in the dilution vial can be prevented more efficiently.

(Item 6) The sample injection device according to any one of items 1 to 5, wherein the one or more than one dissolution devices may be attached to a storage that stores a sample to be supplied to the flow vial.

With this configuration, even in a case in which a sample having a high concentration is stored in the storage, precipitation or recrystallization of the sample in the storage can be prevented.

(Item 7) The sample injection device according to any one of items 1 to 6, wherein the one or more than one sample dissolution devices may further include a heater that heats a sample to promote dissolution of the sample.

In this case, dissolution of a sample is promoted by the heater. This can prevent precipitation or recrystallization of the sample more efficiently.

(Item 8) A sample dissolution device according to another aspect may promote dissolution of a sample supplied to a vial using at least one of ultrasonic waves, an electric field and a magnetic field.

In this sample dissolution device, at least one of ultrasonic waves, an electric field and a magnetic field is used, so that dissolution of a sample supplied to the vial is promoted. This facilitates re-dissolution of the sample even in a case in which precipitation or recrystallization of the sample occurs. Thus, even in a case in which the concentration of a sample is high, precipitation or recrystallization of the sample can be prevented.

The invention claimed is:

1. A sample injection device that injects a sample into a chromatograph, comprising:
   a flow vial to which a sample solution is supplied;
   a sampling needle configured to collect a sample of the sample solution supplied to the flow vial and inject the collected sample into the chromatograph;
   a supply flow path configured to supply the sample solution to the flow vial;
   a discharge flow path configured to discharge at least a portion of the sample solution supplied to the flow vial; and
   one or more than one sample dissolution devices configured to promote dissolution of the sample solution using at least one of ultrasonic waves, an electric field and a magnetic field, wherein
   the one or more than one sample dissolution devices include a first sample dissolution device attached to at least one of the supply flow path and the discharge flow path.

2. The sample injection device according to claim 1, wherein
   the one or more than one sample dissolution devices further include a second sample dissolution device attached to the flow vial.

3. The sample injection device according to claim 1, wherein
   the one or more than one sample dissolution devices further include a second sample dissolution device and a third sample dissolution device that are attached to at least two of the flow vial, the supply flow path and the discharge flow path.

4. The sample injection device according to claim 1, wherein
   the one or more than one sample dissolution devices are configured to promote dissolution of the sample solution by generating at least one of ultrasonic waves, an electric field and a magnetic field in a period including a point in time at which collection of the sample of the sample solution from the flow vial by the sampling needle ends.

5. The sample injection device according to claim 1, further comprising a dilution vial configured to dilute the collected sample, wherein
   prior to injecting the collected sample into the chromatograph, the sampling needle is configured to inject the sample collected from the flow vial into the dilution vial and then operate to inject the sample diluted by the dilution vial into the chromatograph, and
   the one or more than one dissolution devices further include a second sample dissolution device attached to the dilution vial.

6. The sample injection device according to claim 1, wherein
   the one or more than one dissolution devices further include a second sample dissolution device attached to a storage that stores the sample solution to be supplied to the flow vial.

7. The sample injection device according to claim 1, wherein
   at least one of the one or more than one sample dissolution devices further includes a heater that heats the sample to promote dissolution of the sample solution.

* * * * *